United States Patent
Eidson et al.

(10) Patent No.: US 10,198,463 B2
(45) Date of Patent: Feb. 5, 2019

(54) METHODS AND SYSTEMS FOR APPENDING DATA TO LARGE DATA VOLUMES IN A MULTI-TENANT STORE

(75) Inventors: Bill C. Eidson, Palo Alto, CA (US); Simon Z. Fell, Corte Madera, CA (US)

(73) Assignee: salesforce.com, inc., San Francisco, CA (US)

( * ) Notice: Subject to any disclaimer, the term of this patent is extended or adjusted under 35 U.S.C. 154(b) by 321 days.

(21) Appl. No.: 12/961,809

(22) Filed: Dec. 7, 2010

(65) Prior Publication Data

US 2011/0258242 A1 Oct. 20, 2011

Related U.S. Application Data

(60) Provisional application No. 61/324,955, filed on Apr. 16, 2010.

(51) Int. Cl.
*G06F 17/30* (2006.01)

(52) U.S. Cl.
CPC .............................. *G06F 17/30339* (2013.01)

(58) Field of Classification Search
CPC ............. G06F 11/1471; G06F 11/1402; G06F 2221/2101; H04L 61/6077; H04W 28/14
USPC ............................................ 707/825, E17.01
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,014,674 A * | 1/2000 | McCargar |
| 6,092,083 A | 7/2000 | Brodersen et al. |
| 6,169,534 B1 | 1/2001 | Raffel et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,178,425 B1 | 6/2001 | Brodersen et al. |
| 6,266,669 B1 | 7/2001 | Brodersen et al. |
| 6,295,530 B1 | 9/2001 | Ritchie et al. |
| 6,321,239 B1 * | 11/2001 | Shackelford .................. 711/205 |
| 6,324,568 B1 | 11/2001 | Diec |
| 6,324,693 B1 | 11/2001 | Brodersen et al. |

(Continued)

*Primary Examiner* — Syling Yen
*Assistant Examiner* — Soheila (Gina) Davanlou
(74) *Attorney, Agent, or Firm* — Elliott, Ostrander & Preston, P.C.

(57) ABSTRACT

In accordance with embodiments, there are provided mechanisms and methods for appending data to large data volumes in a multi-tenant store. These mechanisms and methods for appending data to large data volumes can enable embodiments to provide more reliable and faster maintenance of changing data. In an embodiment and by way of example, a method for appending data to large data volumes is provided. The method embodiment includes receiving new data for a database. The new data is written to a temporary log. The size of the log is compared to a threshold. Then the log is written to a data store, if the size of the log is greater than the threshold.

20 Claims, 7 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,882,304 B2 * | 2/2011 | English et al. ............... 711/113 |
| 9,081,805 B1 * | 7/2015 | Stamen ............ G06F 17/30297 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0112135 A1 * | 8/2002 | Playe ................. G06F 11/1451 711/162 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0009477 A1 * | 1/2003 | Wilding et al. ............ 707/104.1 |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069874 A1 * | 4/2003 | Hertzog et al. .................. 707/1 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0115145 A1 * | 6/2003 | Lee et al. ......................... 705/54 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0182101 A1 * | 9/2003 | Lambert ............................ 704/1 |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267809 A1 * | 12/2004 | East et al. .................. 707/104.1 |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0234906 A1 * | 10/2005 | Ganti et al. ........................ 707/5 |
| 2005/0234973 A1 * | 10/2005 | Zeng ......................... G06N 5/02 |
| 2007/0078886 A1 * | 4/2007 | Rivette et al. ................. 707/102 |
| 2007/0143299 A1 | 6/2007 | Huras et al. ..................... 707/10 |
| 2007/0143365 A1 * | 6/2007 | D'Souza et al. ............. 707/203 |
| 2007/0220059 A1 * | 9/2007 | Lu et al. ........................ 707/200 |
| 2009/0037492 A1 * | 2/2009 | Baitalmal et al. ............ 707/201 |
| 2011/0082716 A1 * | 4/2011 | Bhamidipaty et al. ...... 705/7.11 |

\* cited by examiner

METHODS AND SYSTEMS FOR APPENDING DATA TO LARGE DATA VOLUMES IN A MULTI-TENANT STORE

CLAIM OF PRIORITY

This application claims the benefit of U.S. Provisional Patent Application No. 61/324,955 entitled Methods and Systems for Appending Data to Large Data Volumes in a Multi-Tenant Store, by Eidson et al., filed Apr. 16, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates to storing data and, in particular, to aggregating data for storage in a common repository.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system relies on the data in the database system complying with certain constraints. However, this limits the types, sizes, and kinds of data that can be stored in the database.

In order to provide for more types, kinds, and sizes of data, the database can be supplemented with an additional data store to hold other data and additional data. The data can be searchable separately or pointers to the separate data store in the database can be searchable. However, the separate data store adds complexity to modifying, correcting, and updating the database and the data store. This added complexity may interfere with users accessing the database and finding data in the separate data store.

BRIEF SUMMARY

In accordance with embodiments, there are provided mechanisms and methods for appending data to large data volumes in a multi-tenant store. These mechanisms and methods for appending data to large data volumes can enable embodiments to provide more reliable and faster maintenance of changing data.

In an embodiment and by way of example, a method for appending data to large data volumes is provided. The method embodiment includes receiving new data for a database. The new data is written to a temporary log. The size of the log is compared to a threshold. Then the log is written to a data store, if the size of the log is greater than the threshold.

While one or more implementations and techniques are described with reference to an embodiment in which Methods and Systems for Appending Data to Large Data Volumes in a Multi-Tenant Store is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Figure 1:
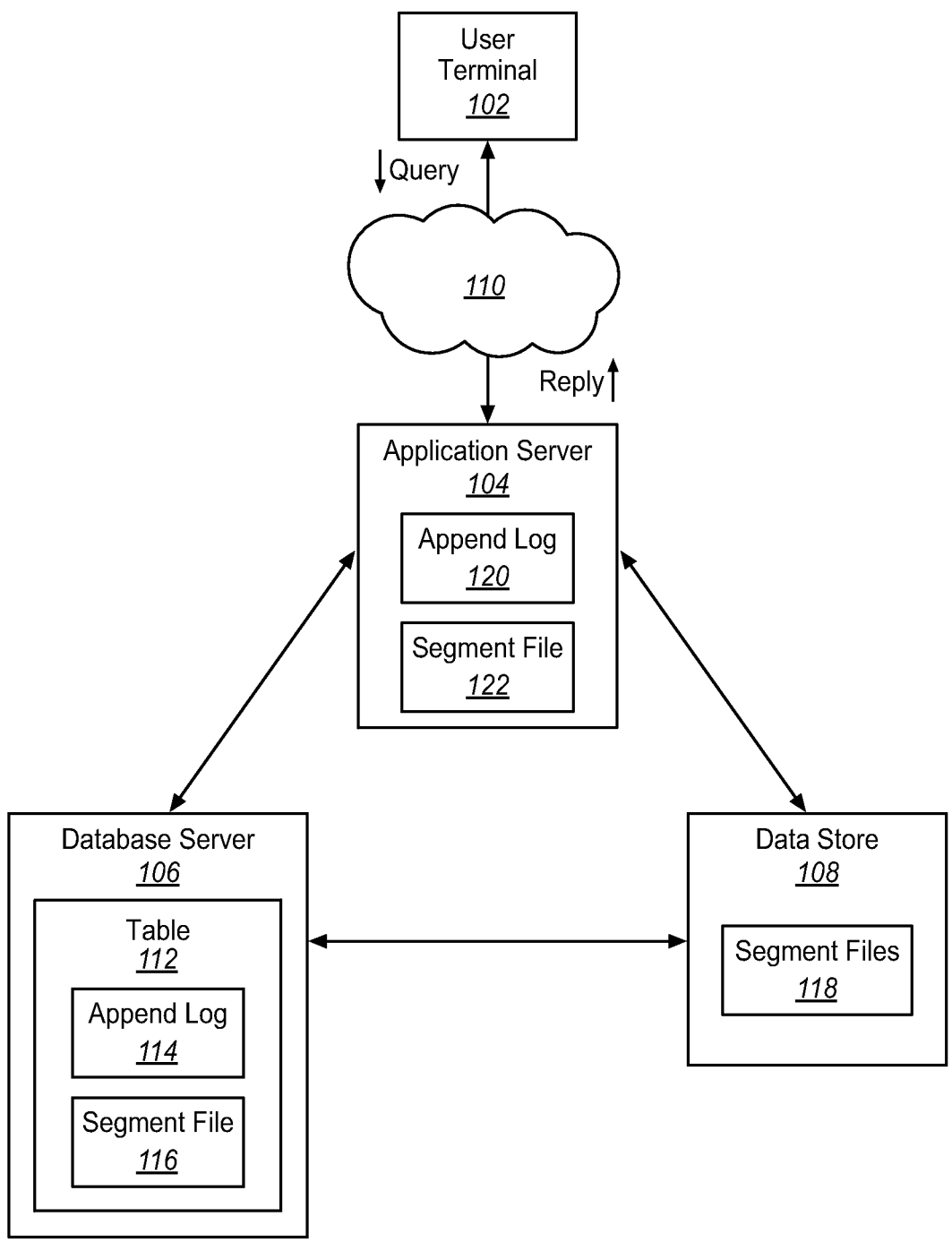
FIG. 1 illustrates a block diagram of a database server structure with appended data an a large data store in an embodiment.

Systems and methods are provided for appending data to large data volumes. These systems and methods are particularly valuable in the context of a multi-tenant database.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for appending data to large data volumes will be described with reference to example embodiments. In one example implementation, a database served and accessed through a database server is augmented with a separate data store. The separate data store has a simple file structure with directories and metadata such as ZFS (an open source file system developed by Sun Microsystems), although a different, simpler, or more complex file structure can be used depending on the application. The files can be accessed through indices, pointers, or references in the database. In the described examples, the data stores files are write-once files with no append capability and a minimum data size, such as 10 MB. The data store therefore can be used to create a small number of large files. The described techniques can be applied to other data store systems with different configuration and constraints. Other databases and file formats can also be supported utilizing similar techniques.

In the examples described below, data, such as database segments, will be stored in the data store, however, because the data store does not work well with smaller files and cannot append, this data will only be written once there is enough data (perhaps 10 MB) to be aggregated into a larger file. The types of data to be aggregated can include incremental data for the database such as inserts, updates, deletes, and supplemental data. This data can be accumulated in a database table (called, for example AppendLog), and, once the data in the AppendLog reaches the predetermined size limit, it is flushed to the data store.

The database table or tables are subject to queries through application servers. The queries may be in any of a variety of different forms, such as OQL (Object Query Language), SQL (Structured Query Language) queries, individual get-by-id requests, or any other type of query, for example. When queries come to the database server, they need to be performed against both the database server AppendLog and the data store segments. In order for the database to respond to the query, the database servers need an up-to-date copy of the entire AppendLog and the data store segment metadata. Accordingly, the application server, when submitting a query request, can, as part of the request, ensure that the database server has an up-to-date copy of the AppendLog data and the data store segment metadata (cached) prior to forwarding the request to the database server.

Structural Environment

FIG. 1 shows a block diagram of a database server structure to aid in understanding the description below. In FIG. 1, a user, client, or customer, through a user terminal 102 sends a request to an application server 104. The user terminal may be directly connected or remotely connected to the application server. The user terminal may be connected though a wide area network, such as the Internet 110, or through a local or private network. The user request may be to view or receive data or information or to modify or add to data or information that is already stored.

The application server 104 is coupled to a database server 106 which serves or receives the information of the request to or from the application server. The database server includes a table 112 in which the data is stored. This data may contain an append log 114 and a segment file 116. The append log contains some number of smaller files and additional files are appended to it as changes are made to the content of the database. As described below, the append log is eventually consolidated into a single file that is stored and a new append log can be started in its place. The segment file contains metadata about files that are stored in another location. The metadata can include file names, ordering, location, and contents information. Alternatively, the append log and segment file may be stored in another location. The table may be in the form of a conventional relational database or in any other form.

The application server is also coupled to a data store 108, as described above. The data store stores segment files 118 and may also store a variety of other files, depending on the particular use made of the data store. In the described examples, a query or other request from the application server is provided only to the database server. In one example, the files of the data store are not searched. Instead, the table includes searchable pointers or indices to the data in the data store. This allows requests to be serviced more quickly. However, for particular requests, or for particular implementations, the data store may contain the pointers or indices or may be searched directly. As shown, the data store includes stored segment files 118 which may be organized using its file system.

The application server also include an append log 120 and a segment file 122. These allow the application server to track changes and progress to both the append log and the segment file in order to manage the collection, updating, and storing of such data. These may both be saved by the database server, instead, depending upon the application. There may be and typically will be multiple user terminals, application servers, database servers, and data stores. The diagram of FIG. 1 shows only one of each in order to simplify the drawing and the understanding of the operations described below.

In one example, the database servers are stateless. They locally cache immutable files and have an in-memory cache of immutable data structures. However, they do not have any "on_startup" bootstrapping or any cross-server synchronization of changes, etc. By providing an in-memory cache, the entire database server state (in the database) does not need to be re-created for every request. The in-memory cache allows the tables and other data to be synchronized without any startup process. As described below, incremental changes are handled, while the servers are kept stateless, and the data store file metadata is stored in the database.

Query Handling

Figure 2:
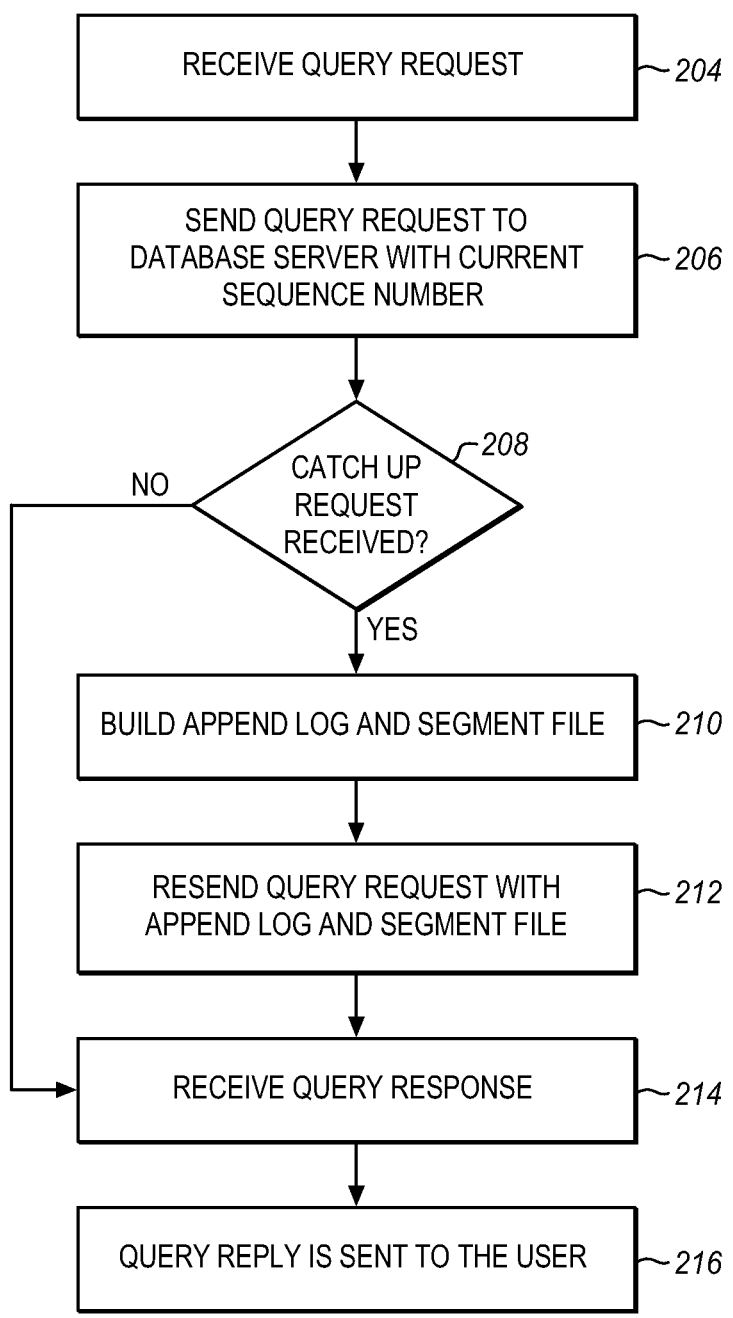
FIG. 2 is an operational flow diagram illustrating serving a query at a user terminal in an embodiment.

FIG. 2 shows an example process for serving a query or other data modification to a database server in the context of the append log and segment file. FIG. 2 is from the perspective of the application server, while FIG. 3 shows the same process from the perspective of the database server.

In FIG. 2, a process begins, at block 204, when the application server receives a request from a user. Alternatively, the request could come from a maintenance application or a developer. The request may be to delete an entry in the database, add an entry, modify an entry or perform a much more complex operation. In one example, the data store is also used to hold large files, such as media, graphic, and high resolution files that are not well-suited to the database. Accordingly, the request may be to add a reference, index, pointer or metadata into the database to allow such a file in the data store to be searched and found from the database.

At block 206, the application server, having received the request, sends it to a database server that can access the database to service the request. The request can contain a current sequence number, so that the database server can ensure that it is working with current data. In this example, the application server accesses a table which provides the most current sequence number for the append log and the segment file. By checking a single authoritative version of the append log and segment file sequence number reference, a single application server can send requests to many different database servers. The database servers are not required to maintain any synchronization.

Figure 3:
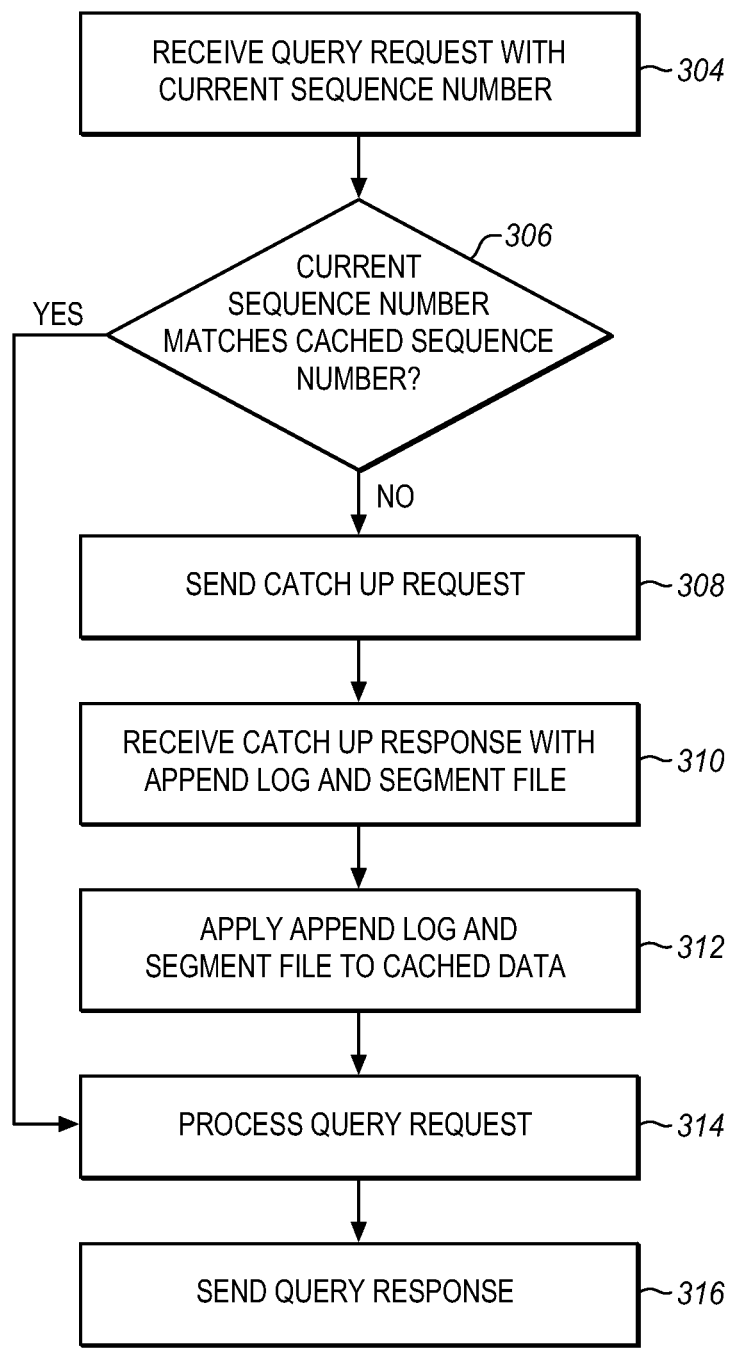
FIG. 3 is an operational flow diagram illustrating serving a query at a database server in an embodiment.

Referring to FIG. 3, the database server at block 304 receives the query request from the application server as mentioned above. The database server then compares the received sequence number for its cached version of the append log and segment file to the received sequence number at block 306. If they match, then the database server processes the request at block 314. The request can be safely processed against the database and also the append log, since the append log will be in its most current form.

On the other hand, if the sequence numbers do not match, then the database server can request that it be sent the latest updates at block 308. The application server at block 206 listens for a catch up request at block 208. If one is received, then at block 210, the application server builds an append log and segment file to send to the database server. This may then be sent together with the query request at block 212. The response to the catch up request can be a complete replacement of the prior append log and segment file, or to reduce the amount of transmitted data between the two servers, the response can contain only the data added since the database server's version was last updated. The database server, for example, can send its most recent sequence number together with its catch up request. By comparing the database server's most recent number to the absolute most recent version, the application server can determine the differences and send only the differences.

In this example, the application server does not send the append log and segment files or their updates with the original request. This is done to reduce the amount of data sent with a request. However, as an alternative, both files may be maintained in a single version and sent to the respective database server in the latest version with each request. The size of the these files can be kept small through frequent updates of the data store or by generating many files. Each tenant, organization, customer etc. may have several different files for different portions of the database fields.

In one example, both the application server and the database server maintain relational database tables and the append logs and segment files are stored in these tables. The append logs and segment files may be stored in any of a variety of different locations in the database that provide sufficient space for the data. In an Oracle Corporation database a BLOB (Binary Large Object) may be used. The BLOB allows several gigabytes of unstructured storage. In the present example, the data may be structured but it need not be structured in a way that is consistent with the rest of the database.

At block 310, the database server receives the response to the catch up request including a partial or complete append log and segment file. After applying the updates at block 312, by updating or replacing, the database server can then process the request at block 314. At block 316, the results are sent back to the application server. At block 214, the application server receives the results and can then service the user at block 216, with a confirmation, report, or reply, depending on the nature of the request.

In one example, the database is divided into groups, organizations, etc. so that, while there may be many append logs and segment files, each one is not very large. This is one reason why any one database server may not be up to date for any one particular table.

As mentioned above, the sequence number (sequence_number) can be used to manage server state for each organization or database table. The sequence number can be used to represent the current state of any given database server organization or table. In one example, a table, such as Table 1, can be used to track the sequence number. The table may use standard 32-way organization partitioning and be an index organized table, however it may also take other forms. The PK (Primary Key) for the table may be selected as table_id, or any other suitable key.

TABLE 1

Core Sequence Number.

| Value | Type | Comments |
| --- | --- | --- |
| organization_id | CHAR(16) | ID for organization |
| table_id | CHAR(16) | ID for table within organization |
| sequence_number | NUMBER | Current database server sequence number |

As indicated in Table 1, the organization identification and the table enumerator are represented as 15 character values, while the sequence number is a number. Any desired string of characters, letter, or number may be used, depending on the application. In the described examples it is either 0 or 1, however a greater range of numbers may be used, depending on the application.

In order to synchronize different databases to the same information, the sequence, number as described above, can be used in all of the different databases in which it occurs. In such an example, the sequence number in any newly visible rows can be checked against an outside source, such as the application server, to ensure that it is greater than all previously visible sequence numbers for that particular organization and table. Based on this check, the integrity of the data can be maintained without an autonomous updating transaction. Instead, the row for this table can be locked and incremented as part of the transaction.

As described, requests to database servers may contain header information in order to convey the current database server state (core_sequence_num, core_append_log, core_segment_file) for the relevant organization, table_ids involved in the operation. (For example, a 'get' operation would only need the table being 'got', but an OQL request would need an entry for each involved table_id).

In one example, each request from the application server to the database server contains for-each table_id in any one organization, a header structure containing: current_sequence_number (from core_sequence_number); and an optional 'catch up' block. The catch up block contains: catchup_from_core_sequence_number; the data from core_segment_file from catchup_sequence_number to current_sequence_number; the data from core_append_log from catchup_sequence_number to current_sequence_number; and any of the schemas from the core_append_log_schema that are required.

When a database server receives a request, the database server actions can be represented in pseudocode as follows:

Examines its in-memory cache to see what the current sequence_number is for the given (organization_id, table_id). (If there's no entry in the cache, then its current_sequence_number can be set to 0).
    If the request's current_sequence_number=cached current_sequence_number then process the request.
    If the request's current_sequence_number>cached current_sequence_number
    If the optional catchup from block is specified and if its catchup_from_sequence_number<=the cached current_sequence_number, then
        Update the local cache with all the changes in the catchup block
        Process the request
        Otherwise (if there is no catchup block or its catchup_from_sequence_number>current_sequence_number) then send back a DATABASE_SERVER_CATCHUP_REQUIRED specifying the cache current_sequence_number.
    Otherwise, if the request's current_sequence_number<cached current_sequence_number
(This is a race-condition state, meaning some other app-server has 'pushed' the server state ahead)
    If the request's current_sequence_number is still cached (not too old), then process the request with the state as of that sequence number.
    Otherwise, send back a DATABASE_SERVER_CATCHUP_REQUIRED specifying the cache current_sequence_number The application server acting upon a client request, performs the actions described in pseudocode below:
    Upon receiving DATABASE_SERVER_SEQUENCE_AHEAD, retry after re-fetching the sequence_number.
    Upon receiving DATABASE_SERVER_CATCHUP_REQUIRED, retry the request, but include the 'catchup' block built from the sequence_number specified in the DATABASE_SERVER_CATCHUP_REQUIRED failure.

With this protocol, the database server always has an up-to-date copy (cached) of the core_append_log and the core_segment_files prior to executing any request; it is logically equivalent to transferring the entire state with every request, but, for efficiency purposes, the server cache ensures that, on-average, only the new append_log data is sent.

Append Log

In one embodiment, the append log may also be stored in a database table as shown by the example of Table 2.

TABLE 2

| Core Database Server Append Log | | |
|---|---|---|
| organization_id | CHAR(15) | The organization |
| table_id | CHAR(15) | The table |
| database server_append_log_id | CHAR(15) | PK |
| sequence_number | NUMBER | Relevant as-of-version |
| raw_data_blob | BLOB | Raw data for the row(s) |

The raw_data/raw_data_blob part of the table stores the actual data of the append log. Typically data is simply appended to this field as it is developed. The data may be stored in any of a variety of different ways. In one example, the data is stored as Avro serialized binary data. Avro is a data serialization system from the Apache Software Foundation Each time there is an insert, update, or delete, a row or set of rows is added to the field in a compressed form. For batch inserts or updates, an append_log row may be created for each insert with the raw_data/raw_data_blob storing the set of data. While Avro serialization is described herein, any of a variety of other data storing techniques may be used instead or in addition.

Figure 4:
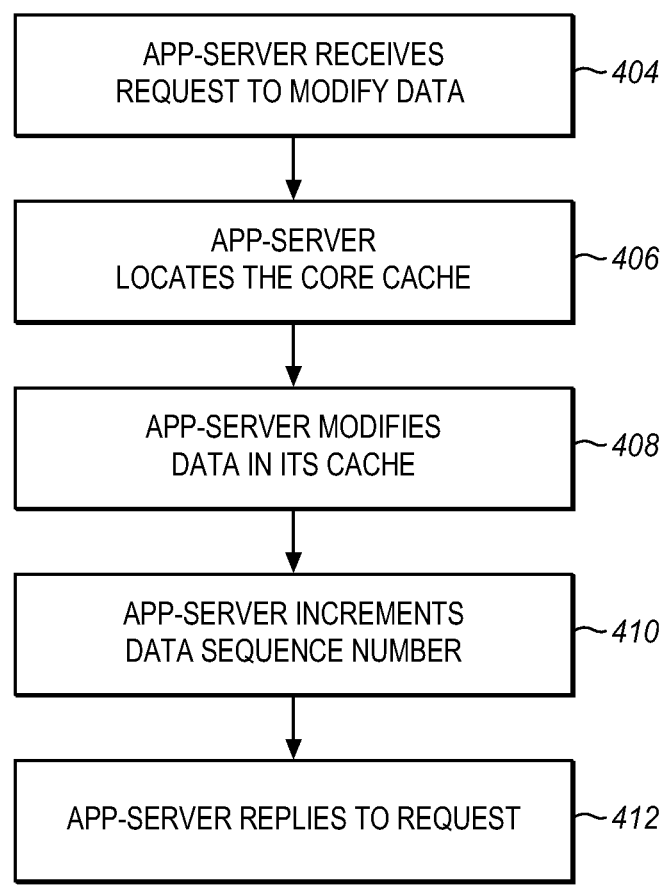
FIG. 4 is an operational flow diagram illustrating updating data in a database server structure in an embodiment.

FIG. 4 shows an example of using the segment file, append log and the tables above to update data in the system. The same or a similar process may be used for deletions, insertions, and other changes. At block 404, the application server receives a request to modify data. This can be an addition, deletion, or change. As mentioned above, this request may be in the form of OQL or any other suitable form, depending on the particular implementation and system needs.

At block 406, the application sever locates the cache with which it will service the request. This corresponds to the core segment file and the core append log. If there is only one application server, the core files may reside with the application server, but they may also reside in another location.

At block 408, the application server, upon receiving the request, modifies the data in the cache based on the request. This data will be in the append log. The application server, accordingly, also increments the data sequence number for the particular append log at block 410. If appropriate for the applicable protocols, the application server can then reply or confirm to the requestor that the request has been fulfilled at block 412.

As described in FIG. 4, the application server performs inserts, deletions, and modifications, without any communication with any database server. In such a configuration the changes are performed only on the core_append_log. The changes will be propagated to the database servers upon processing a new request as in FIGS. 2 and 3.

In another example, a database server may also receive an updated append log, or append log portion and sequence number for its append log, so that versions can be tracked between different database servers and between the database server and the application server.

In one example, all of the changes to the data are made by adding one or more additional rows to the append logs. These can be stored in a free form unstructured field of a database, such as a BLOB field, or in some other easily accessible location. The application servers maintain the current version of the append log and send updates to database servers when they are needed. The append log may be highly structured, but in the described examples, it is not.

To structure the data, periodically, the append log is processed to apply a usable structure. In one example, this happens when the append log becomes large enough to write to the data store. When the append log becomes large enough, the append log is rewritten and formatted to generate a new segment file. The segment file is then written to the data store. However, the segment file could be used by the application server without being written to the data store as new data accumulates further. Alternatively, the data could be processed to form a new formatted append log. Further data changes could then be added to the new append log until the time for generating a new segment file for the data store.

In the described examples, the append log provides a location to which new data may very quickly be added. As a result, queries are not slowed by waiting for new data to be combined or consolidated with older data. The system simply appends the new data to the log and moves on. Because data is added to the append log without any significant processing, there may be additions, deletions, and replacements of particular fields in the same log. In order to use the data to reply to a query, the entire append log can be read to determine the actual status of any particular data value. If, for example, an address is added, and then modified in the append log, then only a complete read of the log will provide the current value. When it comes time to process the append log, the replaced values can be deleted, so that only the last, most current values remain.

In an alternative configuration, the append log may be maintained as it is created. In that configuration, an address change would not simply be appended, but compared to any other previous entries, so that the earlier values can be changed. This requires more processing and analysis and may delay access to the data, however, it reduces the need to reformat the append log later.

Optimization

Figure 5:
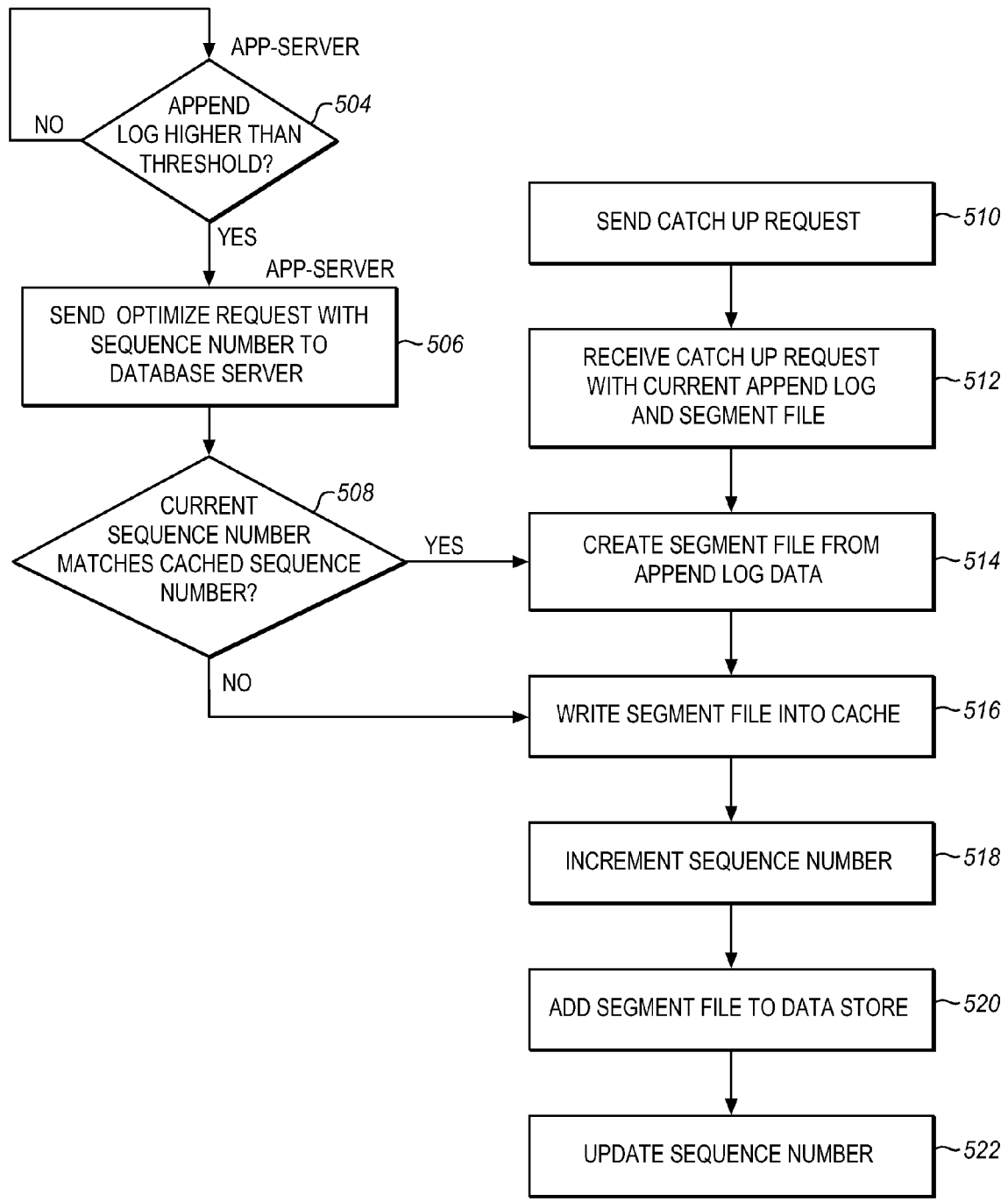
FIG. 5 is an operational flow diagram illustrating optimizing data in a database server structure in an embodiment.

FIG. 5 shows an example of periodically optimizing data from the append log so that a segment file may be written into the data store. At block 504, the application server analyzes the append log to determine its size. The size may be measured in bytes, lines, rows or any other measure. Alternatively, the application server, may analyze the time or number of writes that have been made to the append log. In this example, the application server analyzes the core append log, which is the append log that is the most current.

The determined size, time, or number is then compared to an appropriate threshold. If the threshold has been reached, then at block 506, the application server generates and sends an optimization request. Otherwise the application server will wait or count and repeat the analysis and threshold comparison. In one example, the threshold is selected as a desired size in bytes for writing a file to the data store. The data store may have a minimum file size by design, or the system may be configured to limit the file size of files in the data store in order to reduce the total number of files. Alternatively, a threshold may be used to limit the number or frequency of optimization routines.

The optimization request is sent to the unit that will perform the optimization. This may be any unit from, for example, FIG. 1, or it may be another component not shown in the figures. In one example, the database server performs the optimization due to its connections within the system and its processing capabilities.

The application server may include a sequence number for the most current append log and other information as shown in Tables 3 and 4 in its optimization request. The database server, upon receiving the optimization request from the application server can compare its sequence number for the append log to the received sequence number at block 508. If the database server does not have the current version of the append log, then at block 510 it sends a catch up request back to the application server. The catch up request is a request for the latest version with the sequence number that matches the sequence number received from the application server. The application server will respond to the request and at block 512, the database server receives the most current version of the append log.

Once the database server has the most recent version of the append log, it can then perform the optimization. The optimization is a process that converts the many entries appended together to form the append log into a single segment file with a structured format. To do so, the database server can read all of the entries in the log compare them and rewrite them as a single set of entries containing only the most current data in the log. The entries can also be organized and sorted for more efficient search, retrieval and modification later.

The optimization process at block 514 may be performed by reading all of the files at depth 0 and 1. This is typically all of the files in the append log. The application server can then rewrite all of the files as depth 0 files, delete the existing files, and then write the rewritten files into a new segment file. The new segment file can then be written into the main cache at block 516 to become the new core segment file. The sequence number for the new segment file can be incremented at block 518. The new segment file can also be written into the data store at block 520. The sequence number at the data store can also be incremented or updated to reflect the completion of the operation at block 522.

The segment file can be a file that is created and completed by a single optimization operation. At the next optimization operation, a new segment file is then created. Alternatively, the segment file can be updated with each optimization. The segment file can then be a set of rows, segments, or sub-files. Each change to the segment file can be accompanied by a change to a sequence number so that versions can be tracked as with the append log.

The optimization can be described in pseudo-code as follows:

The application server sends a request to a database server to start optimizing at depth=0.

The database server processes the request (reading all files at depth=0 and depth=1, and rewriting the combination as a new set of depth=0 files).

Once done, the application server deletes any existing core_segment_files for the organization/table_id and depth=0 or depth=1, then writes 1 row per newly created files into core_segment_file where
organization_id=<the org>
core_segment_file_id=<new id>
table_id=<the table>
data_store_file=<the file id>
depth=0—all the new files are at depth 0
sequence_number=<increment core_sequence_number for this organization_id/table_id>, same for all new rows.
starting_key=<the starting key for this file>
ending_key=<the starting key for this file>

After that, the core_segment_file, for this organization/table_id will contain the newly created files at depth 0, and no files at depth 1 (since those were optimized into depth 0).

The sequence number for each of the new rows will be the same number. The lock to increment the sequence number can be taken at the last possible instant before commit.

Figure 6:
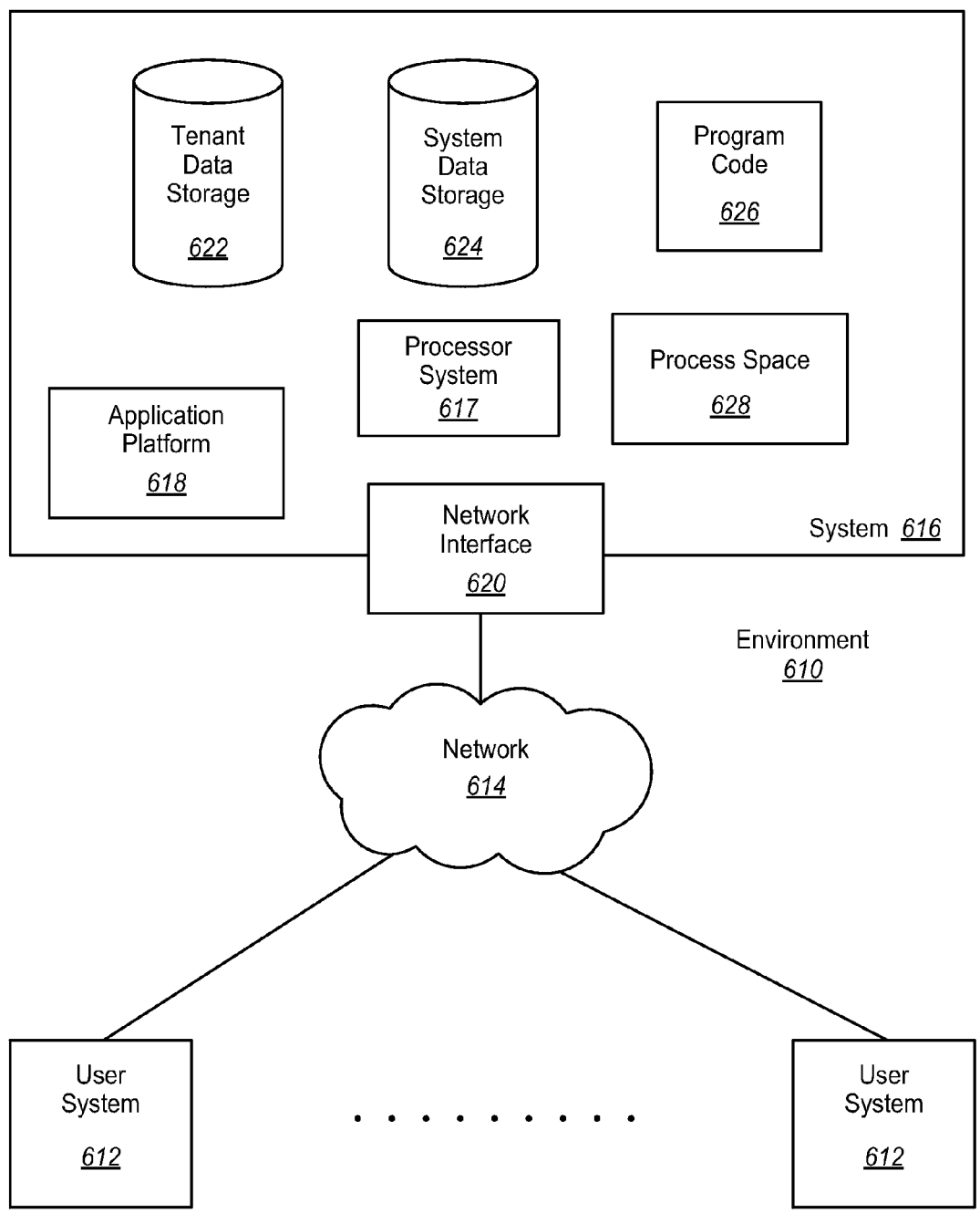
FIG. 6 illustrates a block diagram of an example of an environment wherein an on-demand database service might be used.
Figure 7:
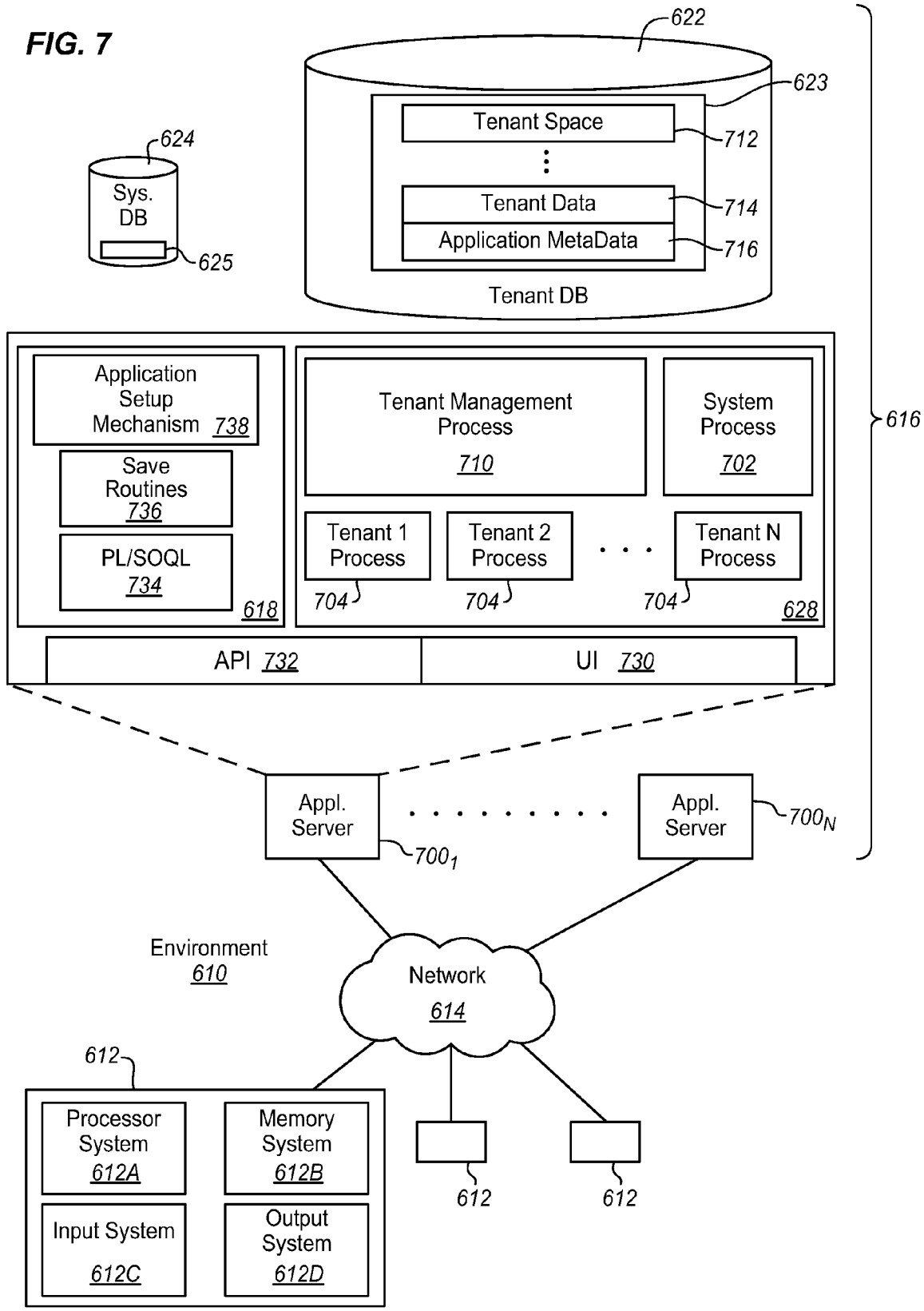
FIG. 7 illustrates a block diagram of an embodiment of elements of FIG. 5 and various possible interconnections between these elements.

The operations and structures described above may be implemented in a variety of different systems and environments. FIGS. 6 and 7 shows one example of an on-demand database environment that may be suitable, depending on the application.

System Overview

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 7001-700N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT DATABASE ON-DEMAND DATABASE SERVICE issued Jun. 1, 2010 to Craig Weissman, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 7001 might be coupled via the network 614 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method performed by a system having at least a processor and a memory therein, wherein the method comprises:
maintaining a plurality of existing entries within a database system, wherein the entries of the database system are arranged into a plurality of segment files, each segment file having a minimum size threshold and an immutable data structure in which data within each respective segment is only written once upon the database system having sufficient data to surpass the minimum size threshold;
receiving new data to be stored within the database system;
writing the new data to an append log maintained by the database system by appending the new data to the append log without updating any of the plurality of segment files of the database system; wherein the new data written to the append log corresponds to one of an entry addition or an entry update within the database system;
comparing the size of the append log to the minimum size threshold and determining the size of the append log is less than the minimum size threshold;
receiving additional data to be stored within the database system, wherein the additional data modifies one or more values of the new data previously received and written to the append log:
writing the additional data to the append log maintained by the database system without updating any of the plurality of segment files of the database system;
comparing the size of the append log having the new data and the additional data written thereto by comparing the size of the append log to the minimum size threshold and determining the size of the append log exceeds the minimum size threshold;
flushing the append log to the database system based on having determined the size of the append log exceeds the minimum size threshold by writing the contents of the append log to a new write once immutable segment file of the database system by comparing all entries within the append log and re-writing all entries of the append log as a single set of entries containing only the most current data in the append log; and
writing a pointer into the database system pointing to the current data that is written to the new write once immutable segment file segment, wherein the current data is accessed through the pointer in the database system.

2. The method of claim 1, wherein writing the additional data to the append log maintained by the database system without updating any of the plurality of segment files of the database system comprises: writing the additional data to the append log separately from the new data written to the append log, wherein the additional data modifies the one or more values of the new data previously received and written to the append log but is written separately from the new data; and wherein flushing the append log to the database system comprises comparing the new data with the additional data to determine the additional data modifies the one or more values of the new data previously received and written to the append log and flushing only the most current data to the new write once immutable segment file of the database system from amongst the new data and the additional data.

3. The method of claim 1, wherein the method further comprises: maintaining the append log by comparing the new data previously written to the append log with the additional data to determine the additional data modifies the one or more values of the new data and updating the append log to retain only the most current data amongst the new data and the additional data; and wherein flushing the append log to the database system comprises writing only the most current data to the new write once immutable segment file of the database system from amongst the new data and the additional data based on the append log having been maintained.

4. The method of claim 1, wherein all changes to data within the append log are made by adding one or more additional rows to the append log.

5. The method of claim 1: wherein all data within the append log is stored within a plurality of rows; and wherein each of the plurality of rows of the append log constitute a free form unstructured field of the database system.

6. The method of claim 5: wherein the plurality of rows of the append log constitute a Binary Large OBject (BLOB) field of the database system having either no structure or a structure which is different than a structure of the plurality of segment files of the database system.

7. The method of claim 1, further comprising: receiving each of the new data and the additional data with a sequence number; and comparing any received sequence number with a most current sequence number for the append log and the plurality of segment files to verify the most current data is being referenced from either the append log or the plurality of segment files.

8. The method of claim 1, wherein writing the pointer into the database system pointing to the current data comprises writing the pointer into the database system referencing the most current data amongst the new data or the additional data as stored within append log.

9. The method of claim 1, wherein writing the pointer into the database system comprises writing the pointer into the append log pointing to the most current data amongst the new data or the additional data as stored within append log.

10. The method of claim 1, wherein the append log has a structure which is different than a structure of the plurality of segment files of the database system; and wherein flushing the append log further reformatting the append log into a format consistent with the structure of the plurality of segment files of the database system before writing the contents of the append log to the new write once immutable segment file of the database system.

11. The method of claim 1, wherein the database system is a multi-tenant database system including separate data for multiple tenants as a single table and wherein writing the new data to the append log comprises writing the new data to a separately maintained append log unique to each tenant.

12. Non-transitory computer readable storage media having instructions stored thereupon that, when executed by a system having at least a processor and a memory therein, the instructions cause the system to perform operations comprising:
maintaining a plurality of existing entries within a database system, wherein the entries of the database system are arranged into a plurality of segment files, each segment file having a minimum size threshold and an immutable data structure in which data within each respective segment is only written once upon the database system having sufficient data to surpass the minimum size threshold; receiving new data to be stored within the database system;

writing the new data to an append log maintained by the database system by appending the new data to the append log without updating any of the plurality of segment files of the database system, wherein the new data written to the append log corresponds to one of an entry addition or an entry update within the database system;

comparing the size of the append log to the minimum size threshold and determining the size of the append log is less than the minimum size threshold;

receiving additional data to be stored within the database system, wherein the additional data modifies one or more values of the new data previously received and written to the append log;

writing the additional data to the append log maintained by the database system without updating any of the plurality of segment files of the database system;

comparing the size of the append log having the new data and the additional data written thereto by comparing the size of the append log to the minimum size threshold and determining the size of the append log exceeds the minimum size threshold;

flushing the append log to the database system based on having determined the size of the append log exceeds the minimum size threshold by writing the contents of the append log to a new write once immutable segment file of the database system by comparing all entries within the append log and re-writing all entries of the append log as a single set of entries containing only the most current data in the append log;

and writing a pointer into the database system pointing to the current data written to the new write once immutable segment file segment, wherein the current data is accessed through the pointer in the database system.

13. The non-transitory computer readable storage media of claim 12: wherein writing the additional data to the append log maintained by the database system without updating any of the plurality of segment files of the database system comprises writing the additional data to the append log separately from the new data written to the append log, wherein the additional data modifies the one or more values of the new data previously received and written to the append log but is written separately from the new data; and wherein flushing the append log to the database system comprises comparing the new data with the additional data to determine the additional data modifies the one or more values of the new data previously received and written to the append log and flushing only the most current data to the new write once immutable segment file of the database system from amongst the new data and the additional data.

14. The non-transitory computer readable storage media of claim 12, wherein the instructions, when executed by the system, cause the system to perform further operations comprising: maintaining the append log by comparing the new data previously written to the append log with the additional data to determine the additional data modifies the one or more values of the new data and updating the append log to retain only the most current data amongst the new data and the additional data; and wherein flushing the append log to the database system comprises writing only the most current data to the new write once immutable segment file of the database system from amongst the new data and the additional data based on the append log having been maintained.

15. The non-transitory computer readable storage media of claim 12: wherein all data within the append log is stored within a plurality of rows; and wherein each of the plurality of rows of the append log constitute a free form unstructured field of the database system.

16. The non-transitory computer readable storage media of claim 12, wherein the instructions, when executed by the system, cause the system to perform further operations comprising: receiving each of the new data and the additional data with a sequence number; and comparing any received sequence number with a most current sequence number for the append log and the plurality of segment files to verify the most current data is being referenced from either the append log or the plurality of segment files.

17. A system comprising:
a processor and a memory to execute instructions at the system;
a database system to maintain a plurality of existing entries, wherein the entries of the database system are arranged into a plurality of segment files, each segment file having a minimum size threshold and an immutable data structure in which data within each respective segment is only written once upon the database system having sufficient data to surpass the minimum size threshold;
a system interface to receive new data to be stored within the database system;
an append log maintained by the database system into which the database system writes the new data by appending the new data to the append log without updating any of the plurality of segment files of the database system, wherein the new data written to the append log corresponds to one of an entry addition or an entry update within the database system; the database system to compare the size of the append log to the minimum size threshold and determining the size of the append log is less than the minimum size threshold; the system interface to receive additional data to be stored within the database system, wherein the additional data modifies one or more values of the new data previously received and written to the append log;
the database system to write the additional data to the append log maintained by the database system without updating any of the plurality of segment files of the database system;
the database system to compare the size of the append log having the new data and the additional data written thereto by comparing the size of the append log to the minimum size threshold and determining the size of the append log exceeds the minimum size threshold;
the database system to flush the append log to the database system based on having determined the size of the append log exceeds the minimum size threshold by writing the contents of the append log to a new write once immutable segment file of the database system by comparing all entries within the append log and re-writing all entries of the append log as a single set of entries containing only the most current data in the append log; and
the database system to write a pointer into the database system pointing to the current data written to the new write once immutable segment file segment, wherein the current data is accessed through the pointer in the database system.

18. The system of claim 17: wherein the additional data is written into the append log separately from the new data written to the append log, wherein the additional data modifies the one or more values of the new data previously received and written to the append log but is written separately from the new data; and wherein the database system to flush the append log comprises the database system to further compare the new data with the additional data to determine the additional data modifies the one or more values of the new data previously received and written to the append log and flushing only the most current data to the new write once immutable segment file of the database system from amongst the new data and the additional data.

19. The system of claim 17: wherein the database system is to further maintain the append log by comparing the new data previously written to the append log with the additional data to determine the additional data modifies the one or more values of the new data and updating the append log to retain only the most current data amongst the new data and the additional data; and wherein the database system to flush the append log comprises writing only the most current data to the new write once immutable segment file of the database system from amongst the new data and the additional data based on the append log having been maintained.

20. The system of claim 17: wherein the database system is to further receive each of the new data and the additional data with a sequence number and compare any received sequence number with a most current sequence number for the append log and the plurality of segment files to verify the most current data is being referenced from either the append log or the plurality of segment files.

* * * * *